Figure 1:
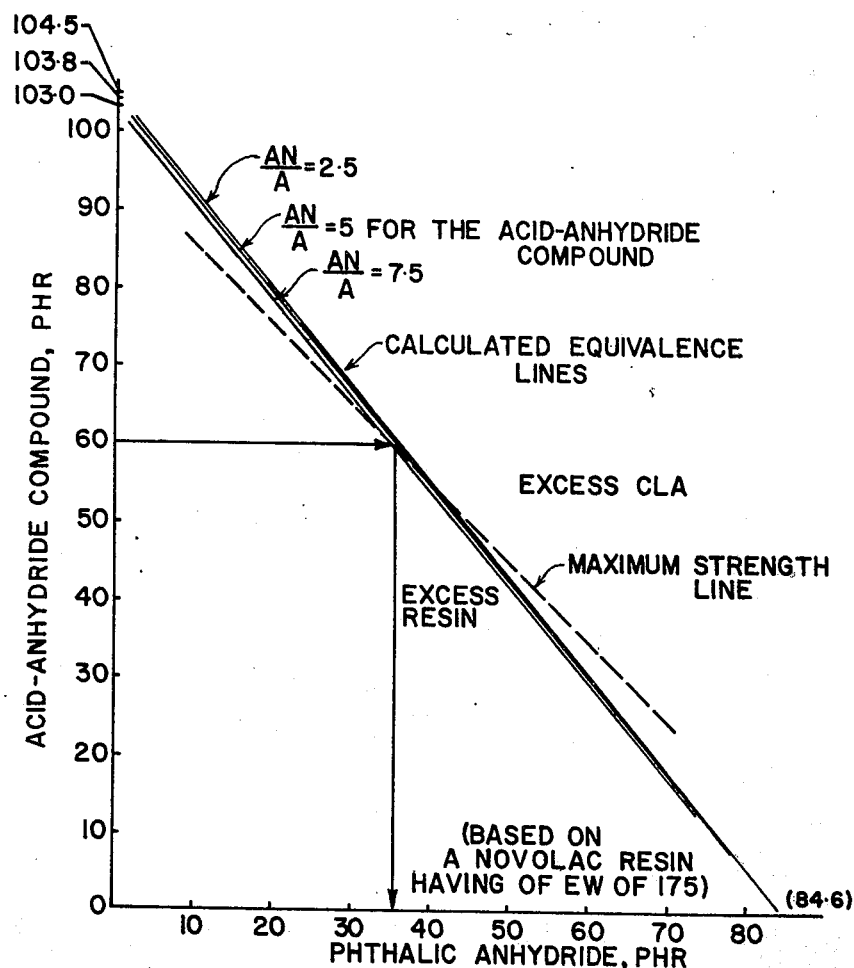

United States Patent [19]

McLean et al.

[11] 3,957,727

[45] May 18, 1976

[54] EPOXY COMPOSITION CONTAINING ACID ANHYDRIDE COMPOUND OBTAINED FROM NADIC METHYL ANHYDRIDE

[75] Inventors: Paul Douglas McLean; Robert Frederick Scott, both of Ottawa, Canada

[73] Assignee: Canadian Patents and Development Limited, Ottawa, Canada

[22] Filed: Dec. 18, 1973

[21] Appl. No.: 425,813

[52] U.S. Cl............................ 260/47 EA; 428/263; 428/268; 260/59 EP; 260/836; 260/837 R
[51] Int. Cl.².................................... C08G 30/12
[58] Field of Search .......... 260/47 EA, 59, 78.4 EP, 260/75 EP, 346.6, 836, 837

[56] References Cited
UNITED STATES PATENTS 3,271,476   9/1966   Widmer et al..................... 260/47 X
3,388,185   6/1968   Goldberg et al.................. 260/47 X

OTHER PUBLICATIONS

Handbook of Epoxy Resins by Lee et al., 1967, par. 12, pp. 5–13 (12–5 to 12–13).

Primary Examiner—Murray Tillman
Assistant Examiner—T. Pertilla
Attorney, Agent, or Firm—Christen & Sabol

[57] ABSTRACT

New epoxy resins are described having high strength and ductility. The novel feature of these new resins is that a normal epoxy resin component is cross-linked with a novel mixture of methyl endomethylene tetrahydrophthalic acid and methyl endomethylene tetrahydrophthalic anhydride. An additional usual anhydride, e.g. phthalic anhydride, may also be present. The products are excellent electrical insulators and are suitable for casting, vacuum filling, laminating, binding, etc.

9 Claims, 2 Drawing Figures

COMPARISON OF STRESS-STRAIN CURVES OF AN ACID-ANHYDRIDE CROSSLINKED EPOXY WITH TYPICAL COMMERCIAL EPOXY SYSTEMS

STOICHIOMETRIC RELATIONSHIPS FOR COMBINATIONS OF ACID-ANHYDRIDE COMPOUND AND PHTHALIC ANHYDRIDE

EPOXY COMPOSITION CONTAINING ACID ANHYDRIDE COMPOUND OBTAINED FROM NADIC METHYL ANHYDRIDE

BACKGROUND OF THE INVENTION

1. Field of the Invention

This invention relates to epoxy resins and, more particularly, to epoxy resins of improved strength and ductility.

2. Description of the Prior Art

Resins known as epoxy resins have received wide industrial acceptance and are used for many different purposes. The epoxy resins themselves are permanently thermoplastic and require the addition of cross-linking agents or other reactive materials in order that they may be cured to hard, infusible resinous products. However desirable as they may be, the cured epoxy products have a serious disadvantage in that they are inherently brittle. This lack of flexibility has restricted their use in many areas.

It is also known, e.g. in Goldberg et al U.S. Pat. No. 3,388,185 patented June 11, 1968 that the properties of epoxy resins can be improved by blending the resin with a polyfunctional anhydride curing agent.

The Gruenwald U.S. Pat. No. 3,396,145 patented Aug. 6, 1968 also describes curing agents for epoxy resins including long chain polyfunctional aliphatic acids or anhydrides. These are intended for improving the elasticity of the cured resin.

However, the present inventors found that although epoxy resins cross-linked with anhydrides had improved tensile strength, the resins exhibited a brittle fracture with a quite low strain at failure.

The object of the present invention is to provide an improved cross-linked epoxy resin having high tensile strength, high elongation, ductility, high interlaminar shear strength, good processability and low cost.

SUMMARY OF THE INVENTION

According to one feature of the present invention, an improved epoxy resin has been developed in which the epoxy resin component is cross-linked with a mixture of methyl endomethylene tetrahydrophthalic acid and methyl endomethylene tetrahydrophthalic anhydride. It has surprisingly been found that the addition of this mixture provides major improvements in tensile strength and elongation at failure in the cured epoxy resin.

Methyl endomethylene tetrahydrophthalic anhydride is commonly known as Nadic methyl anhydride (NMA) and is a low viscosity liquid of about 250 cps at room temperature. It is a very popular anhydride for epide reactive compositions because it is a liquid that can be easily incorporated into the resin and gives products with high heat distortion temperatures. Most anhydrides can be converted to the acid by hydrolysis but they are generally not useful in the epoxy resin technology.

However, in this invention it has been found that a special acid-anhydride compound which is a mixture of methyl endomethylene tetrahydrophthalic acid and methyl endomethylene tetrahydrophthalic anhydride is uniquely effective as a cross-linking agent for epoxies. This special compound will be referred to hereinafter as the "NMA acid-anhydride compound."

The NMA acid-anhydride compound is itself a new material and represents another feature of the present invention. It can readily be produced by heating methyl endomethylene tetrahydrophthalic anhydride with a controlled amount of water. The stoichiometric amount of water is selected for the desired anhydride-acid ratio and this ratio will normally be at least 1, since from a theoretical point of view this is the lowest ratio that can be used with the resin without water being formed in the reaction. The upper limit of the ratio is not critical, but little benefit is obtained with a ratio of anhydride/acid above about 12. The preferred ratio range for commercial processes is about 3 to 10. The low ratios give thick, sticky or solid white crystalline materials while the higher ratios give low viscosity honey colour fluids.

The water should be retained in the system until the reactions are complete and the processing temperature is selected to ensure conversion in a reasonable length of time. For example, by mixing 40 parts methyl endomethylene tetrahydrophthalic anhydride with 1 part water, heating to 85°C and maintaining this for 1½ hours, an NMA acid-anhydride compound is obtained having an anhydride to acid ratio of 2.25:1.

The present invention can be applied to a wide range of epoxy resins including diglycidyl ether of bis-phenol A, e.g. Epon 828 available from Shell Chemical Co., epoxidized novolac resins, e.g. DEN 431 available from Dow Chemical Co., cyclic aliphatic epoxy resins, e.g. ERL 4289 available from Union Carbide Corp., etc.

In order to optimize tensile strength properties, the cross-linking agent is normally used in a concentration of about 50 to 150 parts per hundred resin (phr). Concentration outside this range may be possible depending on the resin used. With a novolac resin having an equivalent weight of 175, very good properties were obtained at a concentration of 80 to 105 phr, with the best values at about 90 to 95 phr. The addition of other anhydrides has a beneficial effect on tensile properties provided the total concentration of the cross-linking agents remains within the above range. Among the other anhydrides there can be mentioned are phthalic anhydride, tetrahydrophthalic anhydride, hexahydrophthalic anhydride, succinic anhydride, dodecenyl succinic anhydride and methyl Nadic anhydride. In terms of cost and effectiveness the phthalic anhydride is particularly desirable. While these additional anhydrides have a beneficial effect, it must be appreciated that the NMA acid-anhydride compound by itself produces an excellent product which can find many practical uses.

A catalyst is required to open the anhydride ring so that union can take place with the epoxy and hydroxyl groups present. There are several methods available for introducing a catalyst into the system. These include:

a. preactivation of the resin
b. preactivation of the cross-linking agent
c. addition of catalyst during or after mixing of the ingredients
d. addition of latent catalyst to the composition.

A tertiary amine catalyst is particularly satisfactory and it is usually used in amounts of about 0.1% to 0.5% based on the resin.

The epoxy resin, NMA acid-anhydride compound, additional anhydride and catalyst can all be mixed together as a single curable composition. The NMA acid-anhydride compound mixes readily with the resin at room temperature and the additional anhydride (phthalic anhydride) dissolves as the mixture is slowly heated with stirring to about 100°C. For large batches, it has been found convenient to add phthalic anhydride to a preheated mixture of resin and NMA acid-anhydride compound where solution is rapid at about 80°C. Lower temperatures may be used but longer times are then required to dissolve the phthalic anhydride.

The curing process is important since high strength and ductility are generally obtained with very carefully controlled heating. Preferably a first stage cure is conducted at low temperatures for long times followed by post curing at elevated temperatures to complete cross-linking. The initial cure is preferably made at a temperature of 90° to 120°C for a period of 1 to 24 hours, most preferably at about 90° to 110°C for 2 to 6 hours. Shorter times are matched with higher temperatures while longer times at the initial temperatures reduces shrinkage and gives increased elongation. There is a tendency for the composition to gel at this stage.

The final cure temperature is higher, hence the molecules become more mobile and all reactions can be completed. It is usually conducted at a temperature of about 150°–175°C for a period of 6 to 8 hours. Thereafter, the product is allowed to cool slowly, usually over a period of about 8 hours, to handling temperature before removal, to reduce internal stressing.

It is particularly noteworthy that during the preparation stage according to this invention (and unlike previous systems) the tendency for phthalic anhydride to fume or sublimate and condense out on cooler parts of the processing equipment is greatly reduced. The temperature at which phthalic anhydride precipitates in a cooling mixture is also greatly reduced.

The curing process is believed to proceed according to the following equation:

the catalyst and joins the epoxy group to give an ester linkage and another active hydroxyl group forms.

Figure 2:
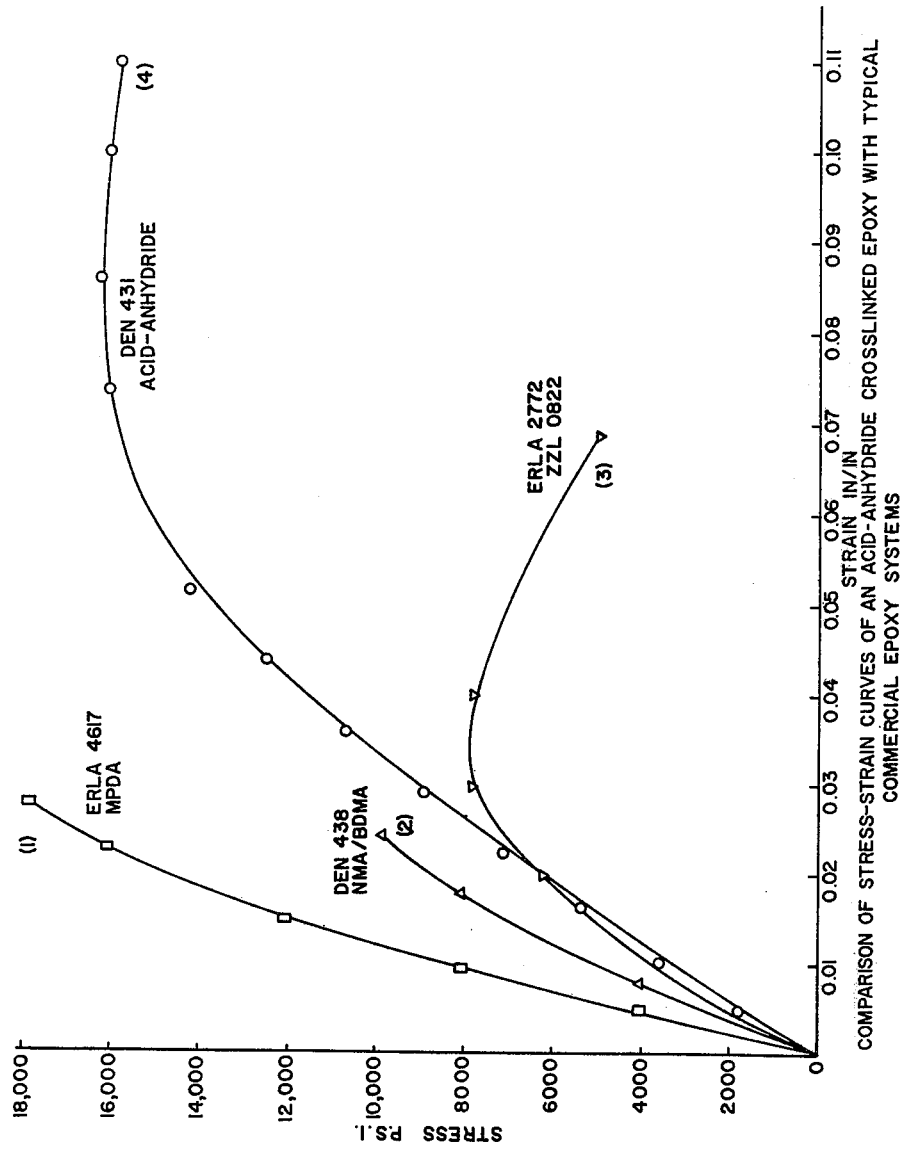

In the drawings which illustrate the invention:

FIG. 1 shows the stoichiometric relationship between the epoxy reactive compositions when it contains two cross-linking agents and a novolac resin with an equivalent weight of 175 i.e. (the NMA acid-anhydride compound, phthalic anhydride and DEN 431 novolac resin) and FIG. 2 is a series of stress-strain curves showing the superior ductility of the products of the invention.

In FIG. 1, a typical line joining 103.8 phr and 84.6 phr is identified as the calculated equivalence line for an acid-anhydride compound having an anhydride:acid ratio of 5:1. The 103.8 phr is the quantity of acid-anhydride compound alone which would completely react with the resin, and the 84.6 phr is the quantity of phthalic anhydride which alone would react completely with the resin. Any point on this line establishes the theoretical quantities of acid-anhydride compound and phthalic anhydride that are required to completely react with the resin. To the right of this equivalence line are excess cross-linking agents (CLA) while to the left there is excess resin. In practice it has been found that maximum strength lies on a line that deviates from this equivalence line as shown in FIG. 1 as maximum strength line. Lines are also included for anhydride:acid ratios of 2.5:1 and 7.5:1.

Thus, as shown by the lines on FIG. 1, if one uses 60 phr of the NMA acid-anhydride compound having an anhydride: acid ratio of 5:1, then 35.5 phr of phthalic

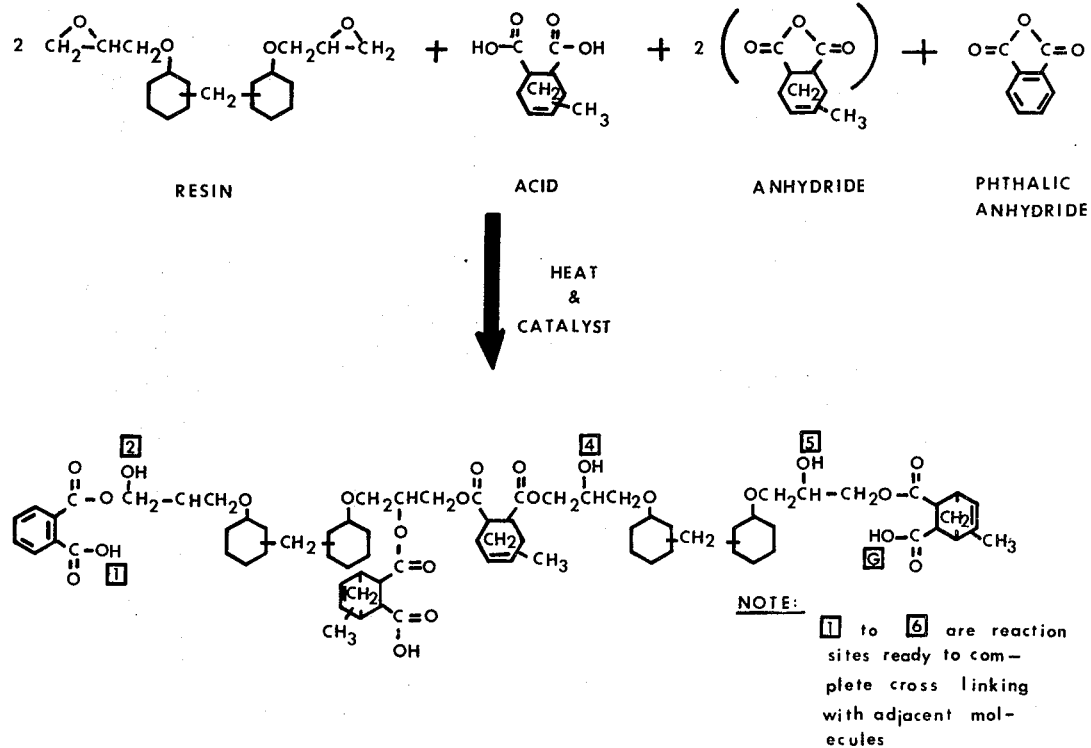

The above equation shows a reaction of a novolac resin with the NMA acid-anhydride compound and phthalic anhydride. In this reaction, the two carboxylic acid groups of the acid react with two epoxy groups of the novolac resin forming an ester and new hydroxyl groups. Each anhydride ring is broken with the aid of anhydride is theoretically required to complete the reactions with the resin.

The physical properties of the compositions of the invention make them excellent candidates as a matrix material in composites because they are strong, ductile and have good elongation at failure.

Other uses of the composition of this invention include vacuum filling of glass fabric followed by curing in a heated hydraulic press. Flat, curved and compound curved hardware are made in this way.

The composition of the invention has a wide range of pot lives depending on catalysis level and temperature which permits proportional ranges of viscosity suitable for impregnation of filaments, yarns, roving or fabrics, for wet winding operation or for the preparation of prepregs for subsequent tailoring and processing by vacuum pressing or autoclave curing.

The composition can also be filled with precipitated silicon dioxide and can be used as a matrix for other fillers or whiskers such as mica platelets or silicon carbide.

Typical of the physical properties are the following:

| | |
|---|---|
| Tensile strength | 15000 – 17000 lb/in$^2$ |
| Elongation at break | 8 – 10% |
| Ductile | illustrated by the hook in the stress-strain curve of FIG. 2 |
| Modulus of elasticity | 3.6 – 4.6 × 10$^5$ lb/in$^2$ |
| Shrinkage | 1 – 1.5% |

It has been noted that generally there is little change in elongation or modulus of elasticity with changes in composition or processing. However, both the kind and quantity of catalyst showed substantial changes in modulus.

The tensile properties are substantially improved in the products of this invention. As a point of comparison, similar products with common epoxy resins and anhydrides in the conventional manner of the epoxy technology have a tensile strength of 12,000 – 13,000 psi. When these same resins are processed according to the present invention the tensile strengths are increased to the levels shown in the table above, along with better elongation at failure and good ductility.

Yet another advantage of the composition of this invention is that the exotherms are quite low and can easily be controlled. This is important when large items are being constructed.

To illustrate the manner in which the invention may be carried out, the following examples are given. It is to be understood, however, that these examples are for the purpose of illustration and the invention is not to be regarded as limited to any of the specific conditions cited herein.

Example 1 a. Pre-activation of the Epoxy Resin

A DEN 431 novolac resin was pre-activated by dissolving 0.1 parts of diethylamine hydrochloride in 100 parts of the resin. This was heated at 185°C for about 10 minutes and then rapidly cooled to room temperature. The preactivated resin had a long shelf life and could be stored at room temperature for several weeks.

b. Preparation of NMA acid-anhydride Compound

To a heating vessel fitted with a condenser were added 800 parts by weight of methyl endomethylene tetrahydrophthalic anhydride, 20 parts by weight of water and 0.2 parts by weight of benzyl dimethylamine (BDMA). This was heated with constant stirring to 85°C and maintained at this temperature of 1½ hours. An NMA acid-anhydride compound was obtained having an anhydride:acid ratio of 2.25:1.

c. Preparing Curable Composition

To 100 parts by weight of the pre-activated novolac resin from part (a) were added 60 parts by weight of NMA acid-anhydride compound and 30 parts by weight of phthalic anhydride. The acid compound mixed readily with the resin and the phthalic anhydride dissolved as the mixture was heated, completely dissolving at about 100°C. The mixture has a viscosity of about 6000 centipoises at room temperature and approximately zero at about 100°C. This makes it possible to use the material in casting, preimpregnation and wet winding while pot life can be controlled by concentration and type of catalyst as well as temperature. When higher viscosities are desired, either resins of higher viscosity and/or acid compounds having higher viscosity may be used.

d. Forming and Curing of Functional Part

An electrical insulator was made by casting the solution of part (c) around a copper table. This solution was poured into a mold, preheated to 100°C and then the total mass was cooled to the cure temperature of 95°C. This initial cure was maintained at 95°C for 6 hours. The final cure was conducted at 160°C for 8 hours followed by cooling at room temperature during an additional 8 hours. The insulator formed was 28 inches long and contained approximately 5.6 kg. of material.

Example 2

A series of curable resin mixes were prepared for determination of tensile properties. An NMA acid-anhydride compound was prepared following the procedure of Example 1(b) to provide a compound with an anhydride:acid ratio of 5.9:1. Various amounts of this was mixed with 100 parts DEN 431 novolac resin and varying amounts of phthalic anhydride was also added to some of the samples as set out in Table 1. Each resin sample was catalyzed with 0.25 phr of benzyldimethylamine and was heated with stirring to about 100°C to form a clear yellowish liquid.

The samples were made in molds consisting of two vertical steel plates, 11 × 7 × ½ in., that were ground to a fine finish of approximately 20 micro inches and separated by a U-shaped metal spacer ⅛ inch thick to control the thickness. A silicone mold release (DOW No. 20) was used to polish the mold components to prevent adhesion of the plastic to the metal.

Each curable resinous sample in the form of a clear yellowish liquid was poured into the molds preheated to 100°c.

Heat was provided by an air circulating oven that has the capacity to raise the temperature from 80° to 200°C in 20 minutes. Of course, the temperature of the mold lags the oven temperature during the second temperature stage.

The sheets were cured with two temperature stages. The first stage was for 6 hours at 100°C and the second was for 8 hours at 160°C. The cast sheets were cooled slowly in the oven, usually overnight, until a handling temperature was reached. The sheets were then removed and marked for identification.

Strips of cast plastic were cut on a high speed cutter to a specimen shape that met ASTM D638-68 type II except that the gauge length is 1 inch. After determination of the dimensions of the cross-section they were loaded in a testing machine with the load and elongation recorded on a chart. With the exception of the specimens used for determining tensile modulus, the elongation corresponding to relative grip movement was recorded. An extensometer or strain gauge was mounted on the specimen to measure elongation when determining modulus values. Tensile modulus of elasticity was determined from the initial slope of the load strain curve. All tests were carried out at room temperature.

The elongation and ductility is maintained over a wide range of concentrations of acid and anhydride with the tensile strengths varying between 15300 to 17300 lb/in² as shown in Table I.

a. A curable composition was prepared consisting of 100 parts by weight of a DEN 431 novolac resin, 60 parts by weight of NMA acid-anhydride compound having a ratio of anhydride:acid of about 5:1 and 30 parts by weight of phthalic anhydride with 0.15% BDMA catalyst.

This composition was used to prepare test samples using the procedure of Example 2. These samples were then cured under a variety of conditions and the stress and elongation of these cured samples was determined. The results are shown in Table 2 below.

TABLE 1

TENSILE RESULTS FROM A SERIES OF ACID-ANHYDRIDE COMPOUND AND PHTHALIC ANHYDRIDE COMBINATIONS

| | | ACID-ANHYDRIDE COMPOUND, PHR | | | | | | | | | |
|---|---|---|---|---|---|---|---|---|---|---|---|
| | | 15 | 25 | 35 | 40 | 47 | 60 | 80 | 90 | 100 | 105 |
| PHTHALIC ANHYDRIDE, PHR | 0 | | | | | | | 15270 | 15570 | 15400 | 15330 |
| | 5 | | | | | | | | | | |
| | 10 | | | | | | | 16110 | | | |
| | 15 | | | | | | | 15960 | | | |
| | 20 | | | | | | | | | | |
| | 25 | | | | | | 16090 | 15500 | | | |
| | 30 | | | | | | 16200 | | | | |
| | 35 | | | | | | 16200 | | | | |
| | 40 | | | | | 16510 | | CATALYSIS CONCENTRATION: | | | |
| | 45 | | | | | 16580 | 15920 | 0.25 PARTS PER HUNDRED OF | | | |
| | 50 | | | | | 16250 | 15550 | ACID-ANHYDRIDE COMPOUND | | | |
| | 55 | | | 16850 | 16750 | | | CURE: 100°C FOR 6 HR. | | | |
| | 60 | | 17020 | 16950 | 16840 | | | 160°C FOR 8 HR. ELONGATION: 8–9% | | | |
| | 65 | | | 16660 | 16240 | | | MODULUS: 0.4–0.5×10⁶ LB/IN² | | | |
| | 70 | 17260 | | | | | | AN/A OF COMPOUND: 5.9 | | | |
| | 75 | | | | | | | EPOXY NOVOLAC RESIN DEN 431 | | | |

TABLE 2

| | Precure Temp. °C | Precure Time Hr. | Post Cure Temp. °C | Post Cure Time hr. | Max Stress psi | Elong* (at break) % |
|---|---|---|---|---|---|---|
| 1. | 100 | 6 | 160 | 8 | 16200 | 9 |
| 2. | 100 | 6 | 160 | 16 | 16513 | 9.1 |
| 3. | 80 | 24 | 160 | 8 | 16599 | 9.3 |
| 4. | 100 / off / 100 | 6 / overnite plus / 6 | 160 | 8 | 16375 | 9.5 |
| 5. | 60 | 24 | 160 | 6½ | 15940 | 8.2 |
| 6. | 100 / off / off | 6 / 2½ hrs. + / overnite + | 160 / 160 / 160 | 50 min. / 1 hr. 10 min. / 5 hrs. | 16427 | 9.2 |
| 7. | 100 | 6 | 160 | 2 | 16211 | 9.2 |

*Note: The strain was estimated from the extension between grips.

Example 3

A series of tests were conducted with different curable compositions of the invention and these were cured under a variety of conditions which deviated from the optimum.

b. Following the same general procedure as (a) above, samples were prepared, cured and tested using a curable composition consisting of 100 parts by weight of a DEN 431 novolac resin and 95 parts be weight of NMA acid-anhydride compound having a ratio of anhydride:acid of 5:1 with 0.24% BDMA catalyst. The results are shown in Table 3 below.

TABLE 3

| | Precure Temp. °C | Precure Time Hr. | Post Cure Temp. °C | Post Cure Time Hr. | Max Stress psi | Elong.* (at break) % |
|---|---|---|---|---|---|---|
| 1. | 100 | 6 | 160 | 8 | 15529 | 9 |
| 2. | 100 | 6 | 160 | 16 | 15763 | 8.6 |
| 3. | 80 | 24 | 160 | 8 | 15471 | 8.8 |
| 4. | 100 / off / 100 | 6 / overnite plus / 6 | 160 | 8 | 15626 | 9.5 |
| 5. | 60 | 24 | 160 | 6½ | 15477 | 8.2 |
| 6. | 100 | 6 | 160 | 2 | 14524 | 6.4** |
| 7. | 100 | 6 | 160 | 4 | 15564 | 8.9 |
| 8. | 100 | 6 | 180 | 8 | 15081 | 7.3** |
| 9. | 100 | 6 | 200 | 8 | 15593 | 8.3 |

**Brittle fracture
*Note: The strain was estimated from the extension between grips.

c. Following the same general procedure as (a) above, samples were prepared, cured and tested using a curable composition consisting of 100 parts by weight of a DEN 431 novolac resin, 80 parts by weight of NMA acid-anhydride compound having a ratio of anhydride:acid of 5:1, 15 parts by weight of phthalic anhydride and 0.20% BDMA catalyst. The results are shown in Table 4 below:

TABLE 4

| | Precure | | Post Cure | | Maximum Stress | Elong.* (at break) |
|---|---|---|---|---|---|---|
| | Temp. °C | Time Hr. | Temp. °C | Time Hr. | psi | % |
| 1. | 100 | 6 | 160 | 8 | 15938 | 9 |
| 2. | 100 | 6 | 180 | 8 | 16017 | 8.9 |
| 3. | 100 | 6 | 200 | 8 | 16033 | 8 |

*Note:
The strain was estimated from the extension between grips.

Example 4

An NMA acid-anhydride compound was prepared following the procedure of Example 1(b) to provide a compound with an anhydride:acid ratio of 3.7:1. With 100 parts of DEN 431 novolac resin were mixed 60 parts of the above acid-anhydride compound, 30 parts phthalic anhydride and 0.1% benzyldimethylamine as catalyst. This mixture was heated with stirring to about 100°C to obtain a clear yellowish liquid curable resin mix.

This curable resin was then used in insulating components of a special 20,000 volt switch. The components were wrapped in glass cloth, assembled in a mold and impregnated with the above liquid resin mix. The resin mix, the switch components and the mold were heated separately to about 100°C before adding the resin to the mold. After the resin was added, the system was evacuated and then the mold was pressurized to 50 psig in a heated press and cured for 6 hr. at 100°C and 8 hr. at 160°C.

Example 5

A series of test samples were prepared from EPON 828 epoxy resin with different cross-linking agents and catalysts. Four different cross-linking agents were used, including nadic methyl anhydride (NMA), the NMA acid-anhydride compound of the invention having a ratio of anhydride:acid of about 5:1, phthalic anhydride (PA) and a mixture of the NMA acid-anhydride compound and phthalic anhydride. The catalysts included tertiary amines available from Rohn and Haas under the trademarks DMP10, and DMP30, a CIBA catalyst having the designation 065 and an amide catalyst developed by National Aeronautical Establishment, Ottawa, shown under the designation No. 1 catalyst. The proportions of components, curing conditions and strength test results are all set out in Table 5.

Example 6

A series of test samples were prepared from ERL 4289 epoxy resin with different cross-linking agents and catalysts, these being the same as in Example 5. The proportions of components, curing conditions and strength test results are all set out in Table 6.

TABLE 5

| Sample No | Cross-Linking Agent | | Catalyst | | First Cure | | Second Cure | | Max Stress psi | % Elong (at break) | Remarks |
|---|---|---|---|---|---|---|---|---|---|---|---|
| | Type | Conc. phr | Type | Conc. phr | Temp. °C. | Time hr. | Temp. °C. | Time hr. | | | |
| 1 | NMA | 90 | No. 1 | 2 | 120 | 3 | 150 | 4 | 11772 | 4.5 | Brittle |
| 2 | NMA | 90 | No. 1 | 2 | 100 | 6 | 160 | 8 | 11290 | 6 | Yield |
| 3 | NMA | 90 | No. 1 | 4 | 100 | 6 | 160 | 8 | 15030 | 8 | Brittle |
| 4 | NMA | 90 | No. 1 | 5.3 | 120 | 3 | 150 | 8 | 11547 | 4.5 | Brittle |
| 5 | NMA | 90 | No. 1 | 4 | 120 | 3 | 150 | 8 | 14838 | 8 | Ductile |
| 6 | NMA | 90 | "065" | 0.83 | 120 | 3 | 150 | 8 | 1899 | 100 | Cold Flow |
| 7 | Acid-Anhyd. | 80 | No. 1 | 2 | 120 | 2 | 150 | 4 | 14006 | 8.5 | Ductile |
| 8 | Acid-Anhyd. | 80 | No. 1 | 2 | 100 | 6 | 160 | 8 | 13859 | 8.5 | Ductile |
| 9 | Acid-Anhyd | 80 | No. 1 | 4 | 120 | 3 | 150 | 8 | 13415 | 8 | Ductile |
| 10 | PA | 75 | No. 1 | 0.67 | 120 | 3 | 150 | 4 | 15119 | 9 | Ductile |
| 11 | PA | 75 | No. 1 | 1.34 | 120 | 3 | 150 | 8 | 15367 | 9 | Ductile |
| 12 | Acid-Anh.+PA | 60 + 20 | DMP10 | 0.25 | 100 | 6 | 160 | 8 | 15166 | 6.7 | Brittle |
| 13 | Acid-Anh.+PA | 60 + 20 | No. 1 | 2 | 120 | 3 | 150 | 4 | 15133 | 7.5 | Ductile |
| 14 | Acid-Anh.+PA | 60 + 20 | DMP30 | 0.25 | 100 | 6 | 160 | 8 | 14946 | 8 | Ductile |
| 15 | Acid-Anh.+PA | 60 + 20 | No. 1 | 2 | 120 | 3 | 150 | 8 | 15091 | 6.5 | Brittle |
| 16 | Acid-Anh.+PA | 60 + 20 | 065 | 0.83 | 120 | 3 | 150 | 8 | 13710 | 6 | Brittle |

NOTE:
"Acid-Anhyd." is NMA acid-anhydride compound of invention having a ratio of anhydride:acid of about 5:1
DMP10 is a trademark of Rohm & Haas for a tertiary-amine catalyst
DMP30 is a trademark of Rohm & Haas for a tertiary-amine catalyst
065 is a trade designation for a CIBA catalyst
"No. 1" is a house designation for an amide catalyst developed by National Aeronautical Establishment, Ottawa, Canada Example 7

In order to illustrate the ductility of the resin of the invention, stress-strain data was obtained on a sample of the resin of the invention as well as on three typical commercial epoxy systems. This data was plotted to form the curves of FIG. 2.

Curve 1 is for ERLA 4617 epoxy resin with meta phenylene diamine, while curve 2 is for DEN 438 epoxy resin with NMA cross-linking agent and BDMA catalyst. Curve 3 is for ERLA 2772 epoxy resin with ZZL 0822 cross-linking agent. Finally, curve 4 is for resins of the invention, i.e. DEN 431 cross-linked with the NMA acid-anhydride compound.

Curves 1 and 2 are typical examples of brittle fracture while curves 3 and 4 illustrate ductility.

TABLE 6

| Sample No | Cross-Linking Agent Type | Conc. phr | Catalyst Type | Conc. phr | First Cure Temp. °C. | First Cure Time hr. | Second Cure Temp. °C. | Second Cure Time hr. | Max Stress psi | % Elong. (at break) | Remarks |
|---|---|---|---|---|---|---|---|---|---|---|---|
| A | NMA | 80 | No. 1 | 2 | 100 | 6 | 160 | 8 | — | — | Solid flexible weak |
| B | NMA | 80 | No. 1 | 4 | 100 | 6 | 160 | 8 | — | — | Solid flexible stronger |
| C | NMA | 80 | DMP10 | 1 | 100 | 6 | 160 | 8 | 1904 | 40–45 | — |
| D | NMA | 80 | "065" | 0.83 | 100 | 6 | 160 | 8 | 10102 | 8.9 | Ductile |
| E | NMA | 80 | BDMA | 0.83 | 100 | 6 | 160 | 8 | — | — | Soft flexible weak |
| F | Acid-Anhyd. | 68 | No. 1 | 2 | 120 | 3 | 150 | 4 | 6886 | 20 | Ductile |
| G | Acid-Anhyd. | 68 | No. 1 | 2 | 120 | 3 | 150 | 8 | 9050 | 15 | Ductile |
| H | Acid-Anhyd. | 68 | No. 1 | 2 | 100 | 6 | 160 | 8 | 9550 | 9 | Ductile |
| I | Acid-Anhyd. | 68 | DMP10 | 0.25 | 100 | 6 | 160 | 8 | 10158 | 6.7 | Brittle |
| J | Acid-Anhyd. | 68 | DMP30 | 0.25 | 100 | 6 | 160 | 8 | 10319 | 8 | Ductile |
| K | Acid-Anhyd. | 68 | "065" | 0.83 | 120 | 3 | 150 | 8 | 11180 | 8 | Ductile |
| L | Acid-Anhyd. | 68 | DMP10 | 0.5 | 120 | 3 | 150 | 8 | 10496 | 7 | Brittle |

NOTE:
"Acid-Anhyd" is NMA acid-anhydride compound of invention having a ratio of anhydride:acid of about 5:1
DMP10 is a trademark of Rohm & Haas for a tertiary amine catalyst
DMP30 is a trademark of Rohm & Haas for a tertiary amine catalyst
065 is a trade designation for a CIBA catalyst
"No. 1" is a house designation for an amide catalyst developed by National Aeronautical Establishment, Ottawa, Canada.

We claim:
1. A heat curable composition of matter comprising (1) an epoxy resin selected from the group consisting of diglycidyl ether of bis-phenol A, epoxidized novolac resins and cyclic aliphatic epoxy resins and (2) as curing agent an acid-anhydride compound having an anhydride to acid ratio in the range of from 3-12:1 obtained by heating methyl endomethylene tetrahydrophthalic anhydride with the stoichiometric amount of water required to produce the required anhydride-acid ratio.

2. A composition according to claim 1 wherein about 50 to 150 parts by weight of cross-linking agent are present per hundred parts by weight resin.

3. A composition according to claim 2 wherein the ratio of said anhydride to said acid is 3 – 10:1.

4. A composition according to claim 2 wherein an additional anhydride cross-linking agent is present, the total amount of cross-linking agent being about 50 to 150 phr.

5. A composition according to claim 4 wherein the additional anhydride is selected from the group consisting of phthalic anhydride, tetrahydrophthalic anhydride, hexahydrophthalic anhydride, succinic anhydride and dodecenyl succinic anhydride.

6. A composition according to claim 4 wherein up to 70 phr of the additional anhydride is present.

7. A composition according to claim 2 wherein the epoxy component is a novolac resin having an equivalent weight of about 175.

8. A composition according to claim 7 wherein the amount of cross-linking agent is about 80 to 105 phr.

9. A composition according to claim 8 wherein the amount of cross-linking agent is about 90 to 95 phr.

* * * * *